(12) United States Patent
Leng

(10) Patent No.: US 12,440,039 B2
(45) Date of Patent: Oct. 14, 2025

(54) ELASTIC MODULE COMPRISING SPRINGS IN MULTIPLE LAYERS AND ELASTIC MATTRESS

(71) Applicant: New-Tec Integration (Xiamen) Co., Ltd., Xiamen (CN)

(72) Inventor: Luhao Leng, Xiamen (CN)

(73) Assignee: New-Tec Integration (Xiamen) Co., Ltd., Xiamen (CN)

( * ) Notice: Subject to any disclaimer, the term of this patent is extended or adjusted under 35 U.S.C. 154(b) by 232 days.

(21) Appl. No.: 18/136,369

(22) Filed: Apr. 19, 2023

(65) Prior Publication Data

US 2024/0298811 A1    Sep. 12, 2024

(30) Foreign Application Priority Data

Mar. 10, 2023  (CN) .......................... 202310225287.7

(51) Int. Cl.
*A47C 27/06* (2006.01)
*A47C 27/04* (2006.01)
(Continued)

(52) U.S. Cl.
CPC ............ *A47C 27/064* (2013.01); *A47C 27/07* (2013.01); *A47C 27/04* (2013.01); *A47C 27/045* (2013.01);
(Continued)

(58) Field of Classification Search
CPC ..... A47C 27/064; A47C 27/063; A47C 27/06; A47C 27/062; A47C 27/05; A47C 27/053;
(Continued)

(56) References Cited

U.S. PATENT DOCUMENTS 201,158 A * 3/1878 Carter .................. A47C 23/007
5/255
614,987 A * 11/1898 Ryan ...................... A47C 23/30
5/252

(Continued)

FOREIGN PATENT DOCUMENTS

CN    204812973 U    12/2015
CN    105747679 A    7/2016
(Continued)

OTHER PUBLICATIONS

Written Opinion cited in PCT/CN2024/080797, mailed Jun. 7, 2024, 9 pages.
(Continued)

*Primary Examiner* — Justin C Mikowski
*Assistant Examiner* — Morgan J McClure
(74) *Attorney, Agent, or Firm* — Cooper Legal Group, LLC

(57) ABSTRACT

An elastic module comprising springs in multiple layers comprises springs in a first layer of the multiple layers, springs in a second layer of the multiple layers, and a flexible material balancing layer. The springs in the first layer are arranged in rows and lines to form a preset shape or staggered in rows to form the preset shape, the springs in the second layer are disposed on the springs in the first layer in a same layout, and the flexible material balancing layer is disposed between the springs in the first layer and the springs in the second layer to connect the springs in the first layer and the springs in the second layer in a lateral direction.

21 Claims, 13 Drawing Sheets

(51) Int. Cl.
*A47C 27/045* (2006.01)
*A47C 27/05* (2006.01)
*A47C 27/07* (2006.01)
*A47C 27/20* (2006.01)

(52) U.S. Cl.
CPC .............. *A47C 27/05* (2013.01); *A47C 27/06* (2013.01); *A47C 27/062* (2013.01); *A47C 27/063* (2013.01); *A47C 27/20* (2013.01)

(58) Field of Classification Search
CPC . A47C 27/056; A47C 27/045; A47C 27/0453; A47C 27/0456; A47C 27/04; A47C 27/065; A47C 27/07; A47C 27/20
See application file for complete search history.

(56) References Cited

U.S. PATENT DOCUMENTS

| | | | | |
|---|---|---|---|---|
| 1,703,587 | A * | 2/1929 | Kraft | A47C 27/062 5/252 |
| 1,741,847 | A * | 12/1929 | Kaspar | A47C 23/055 5/252 |
| 3,462,779 | A * | 8/1969 | Thompson | A47C 27/063 5/655.8 |
| 3,563,525 | A * | 2/1971 | Narabu | E02B 3/26 267/140 |
| 3,869,739 | A * | 3/1975 | Klein | A47C 27/20 5/718 |
| 5,551,673 | A * | 9/1996 | Furusawa | B60R 19/02 267/165 |
| 5,632,473 | A * | 5/1997 | Dias Magalhaes Queiroz | F16F 3/023 267/164 |
| 5,860,637 | A * | 1/1999 | Mandon | B60G 99/006 267/164 |
| 6,113,082 | A * | 9/2000 | Fujino | F16F 1/025 267/110 |
| 6,397,418 | B1 * | 6/2002 | Stjerna | A47C 27/062 5/655.8 |
| 6,427,990 | B1 * | 8/2002 | Hartmann | A47C 27/065 5/255 |
| 6,533,258 | B2 * | 3/2003 | Monson | F16F 1/374 267/141 |
| 6,994,333 | B2 * | 2/2006 | Lobry | A47C 23/002 267/153 |
| 7,849,546 | B2 * | 12/2010 | Wieland | A47C 27/065 267/164 |
| 7,850,153 | B2 * | 12/2010 | Bock | A47C 27/064 5/247 |
| 7,931,257 | B2 * | 4/2011 | VanDeRiet | A47C 7/029 267/142 |
| 10,820,716 | B1 * | 11/2020 | Antinori | A47C 27/062 |
| 12,016,811 | B2 * | 6/2024 | Hopkins | A61G 7/0573 |
| 2004/0025256 | A1 | 2/2004 | Mossbeck | |
| 2004/0128773 | A1 * | 7/2004 | Barber | F16F 1/08 5/716 |
| 2007/0022538 | A1 * | 2/2007 | Zschoch | A47C 23/002 5/655.8 |
| 2009/0014929 | A1 * | 1/2009 | Bock | A47C 27/065 267/179 |
| 2009/0106908 | A1 * | 4/2009 | DeFranks | A47C 23/0438 5/716 |
| 2011/0004998 | A1 * | 1/2011 | Losio | A47C 23/002 5/699 |
| 2012/0200018 | A1 * | 8/2012 | Paz | A47C 7/027 267/166.1 |
| 2012/0272457 | A1 * | 11/2012 | Allman | A47C 27/14 428/105 |
| 2015/0157136 | A1 * | 6/2015 | Alzoubi | A47C 27/15 5/718 |
| 2016/0270545 | A1 | 9/2016 | Codos | |
| 2017/0251820 | A1 * | 9/2017 | Long | A47C 27/008 |
| 2018/0140105 | A1 * | 5/2018 | Spinks | B68G 7/05 |
| 2018/0255937 | A1 * | 9/2018 | Longman | A47C 27/061 |
| 2019/0110606 | A1 * | 4/2019 | Bretis | A47C 27/07 |
| 2019/0216226 | A1 * | 7/2019 | Theosabrata | A47C 27/084 |
| 2020/0187665 | A1 * | 6/2020 | Duncan | A47C 27/045 |
| 2024/0122363 | A1 * | 4/2024 | Aludra | A47C 27/065 |

FOREIGN PATENT DOCUMENTS

| | | |
|---|---|---|
| CN | 106175257 A | 12/2016 |
| CN | 106820768 A | 6/2017 |
| CN | 209360151 U | 9/2019 |
| CN | 210493418 U | 5/2020 |
| CN | 210842381 U | 6/2020 |
| CN | 215304454 U | 12/2021 |
| CN | 216478624 U | 5/2022 |
| CN | 217987146 U | 12/2022 |
| EP | 2090196 A2 | 8/2009 |
| EP | 4098604 A1 | 12/2022 |

OTHER PUBLICATIONS

Search Report cited in PCT/CN2024/080797, mailed Jun. 7, 2024, 8 pages.
EP Search Report cited in EP23172903, mailed Oct. 24, 2023, 3 pages.
First EP Office Action cited in EP23172903, mailed Nov. 14, 2023, 5 pages.
Second EP Office Action cited in EP23172903, mailed Dec. 6, 2024, 4 pages.

* cited by examiner

ELASTIC MODULE COMPRISING SPRINGS IN MULTIPLE LAYERS AND ELASTIC MATTRESS

RELATED APPLICATIONS

This application claims priority to Chinese patent application number 202310225287.7, filed on Mar. 10, 2023. Chinese patent application number 202310225287.7 is incorporated herein by reference.

FIELD OF THE DISCLOSURE

The present disclosure relates to an elastic module, and in particular relates to an elastic module comprising springs in multiple layers.

BACKGROUND OF THE DISCLOSURE

Springs are basic elements of elastic mattresses. The springs are not easy to assemble, and bottoms or tops of the springs are usually connected, resulting in simultaneous interlocking movement between the springs. Deformation and support of the elastic mattress cannot follow a track of position variations of a human body. The existing elastic mattress usually consists of a sponge and the springs. The springs are fixed on a rigid base plate and will shake left-right when the springs are compressed. In order to prevent the springs from getting entangled, the springs are arranged in a low density or the springs are rigidly connected with each other. A sponge is overlapped on the springs to enable the springs to form an integral structure. The sponge needs to have a certain hardness and thickness to play a supporting and connecting role. The sponge is not easily handled, is large, and is not environmentally friendly. For common mattresses, only the bedspread can be detached, while the sponge cannot be detached and cannot be easily cleaned. Even in a case where the latex may have some anti-mite effects, the elastic mattress may be used for several years, and the sponge causes great health risks since the sponge is not easily cleaned.

Therefore, a design of the elastic mattress needs to be improved, so that use of the sponge can be reduced or not even be used, the elastic mattress prepared by the springs has better integrity, elasticity of the elastic mattress can be adjusted following with position variations of human body, and the elastic mattress has better comfort due to a reasonable setting of the springs.

BRIEF SUMMARY OF THE DISCLOSURE

An objective of the present disclosure is to provide an elastic module in which each spring independently provides elasticity, and adjacent springs are rarely or even not involved with each other. A structure for fixing cannot be required to be connected to top ends of the springs.

A first technical solution of the present disclosure is as follows.

An elastic module comprising springs in multiple layers comprises springs in a first layer of the multiple layers, springs in a second layer of the multiple layers, and a flexible material balancing layer. The springs in the first layer are arranged in rows and lines to form a preset shape or staggered in rows to form the preset shape, the springs in the second layer are disposed on the springs in the first layer in a same layout, the springs in the first layer and the springs in the second layer are independently wrapped by flexible material sleeves, and the flexible material balancing layer is disposed between the springs in the first layer and the springs in the second layer to connect the springs in the first layer and the springs in the second layer in a lateral direction.

In a preferred embodiment, the springs in the first layer and the springs in the second layer are connected by connectors.

In a preferred embodiment, an area of bottom surfaces of the springs in the second layer is larger than an area of other lateral cross-sections of the springs in the second layer, and the springs in the second layer abut each other.

In a preferred embodiment, the springs in the second layer abut each other next to the flexible material balancing layer.

In a preferred embodiment, lower ends of the springs in the first layer abut each other, or upper ends of the springs in the second layer abut each other.

An elastic module comprising springs in multiple layers, comprises springs in a first layer of the multiple layers, springs in a second layer of the multiple layers, springs in a third layer of the multiple layers, and flexible material balancing layers. The springs in the first layer are arranged in rows and lines to form a preset shape or staggered in rows to form the preset shape, the springs in the second layer are disposed on the springs in the first layer in a same layout, the springs in the third layer are also disposed on the springs in the second layer in a same layout, the springs in the first layer, the springs in the second layer, and the springs in the third layer are independently wrapped by flexible material sleeves, and the flexible material balancing layers are disposed between the springs in the first layer and the springs in the second layer and between the springs in the second layer and the springs in the third layer to connect the springs in the multiple layers in a lateral direction.

In a preferred embodiment, the springs in the second layer are connected to the springs in the first layer and the springs in the third layer by connectors.

In the present disclosure, the same layout comprises roughly the same layout.

The present disclosure comprises the springs in the multiple layers, and the adjacent springs are connected by flexible materials. Interferences between the springs are little. Lifting and lowering of the springs can follow position variations of a human body, and the springs on a side can independently show elasticity.

DETAILED DESCRIPTION OF THE EMBODIMENTS

Embodiment 1

Figure 1:
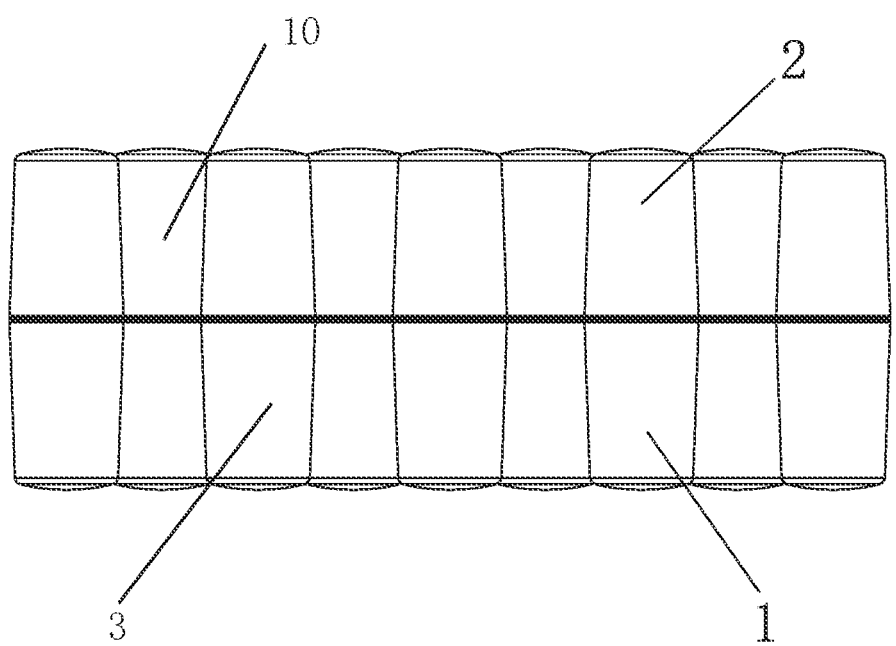
FIG. 1 illustrates a front view of an elastic module in Embodiment 1 of the present disclosure.
Figure 2:
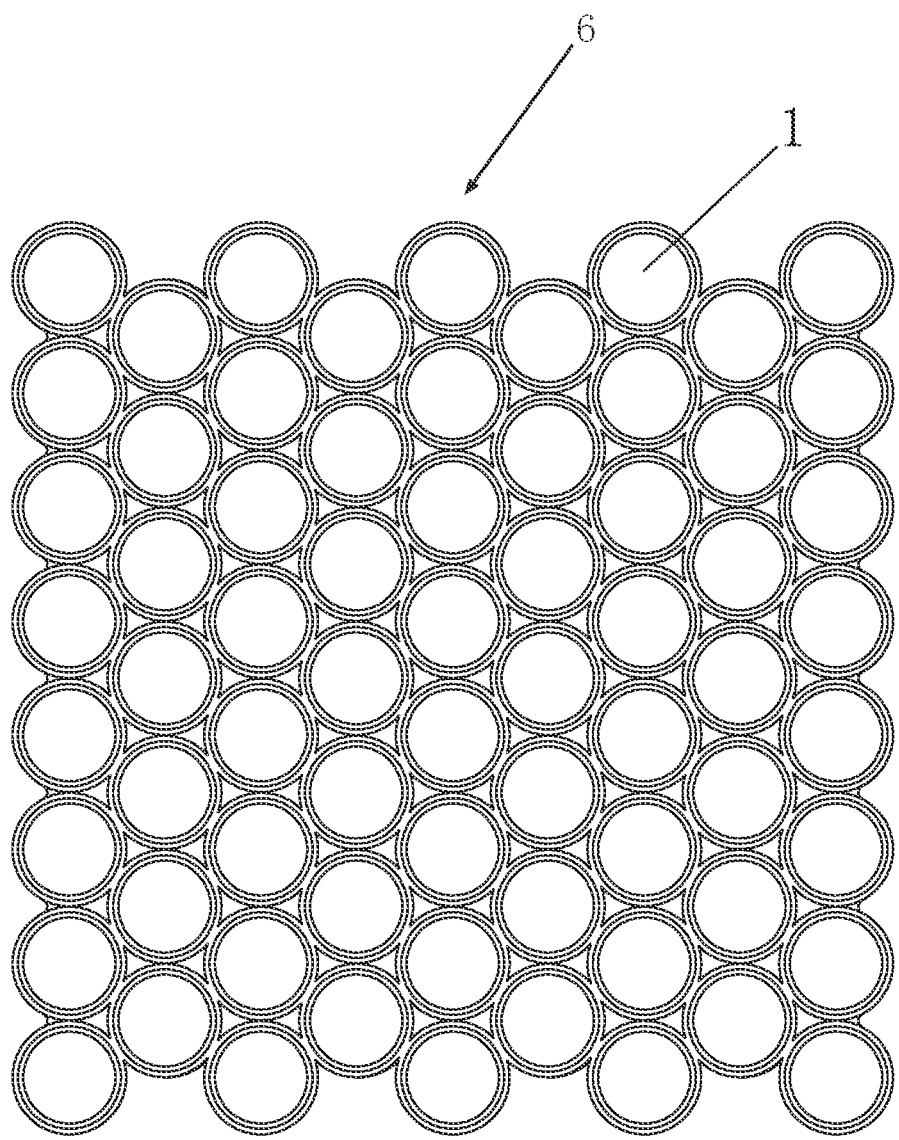
FIG. 2 illustrates a bottom view of FIG. 1 of the elastic module of Embodiment 1.
Figure 3:
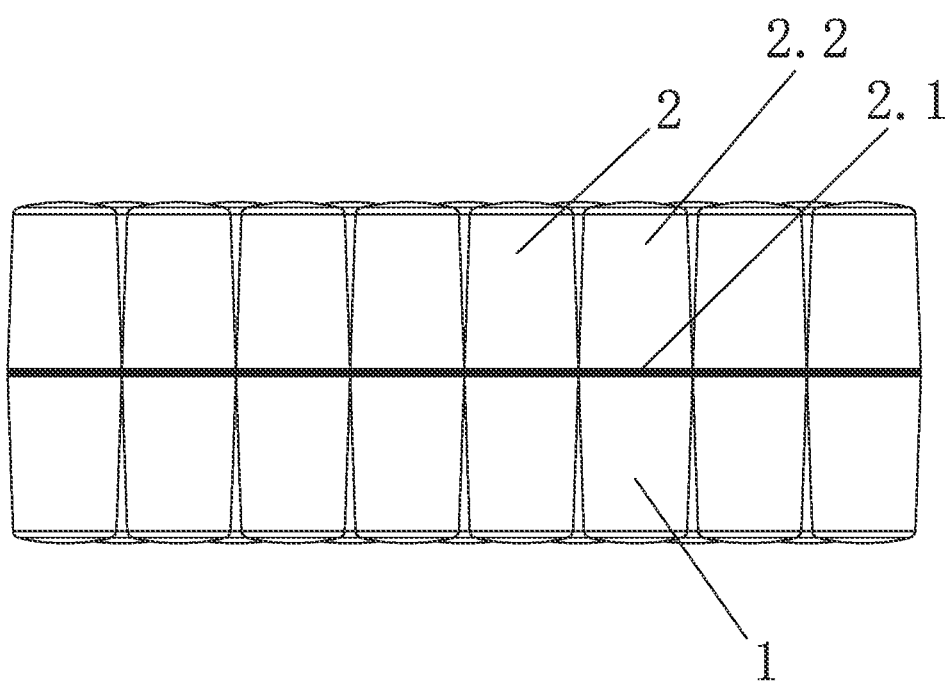
FIG. 3 illustrates a side view of FIG. 1 of the elastic module of Embodiment 1.
Figure 4:
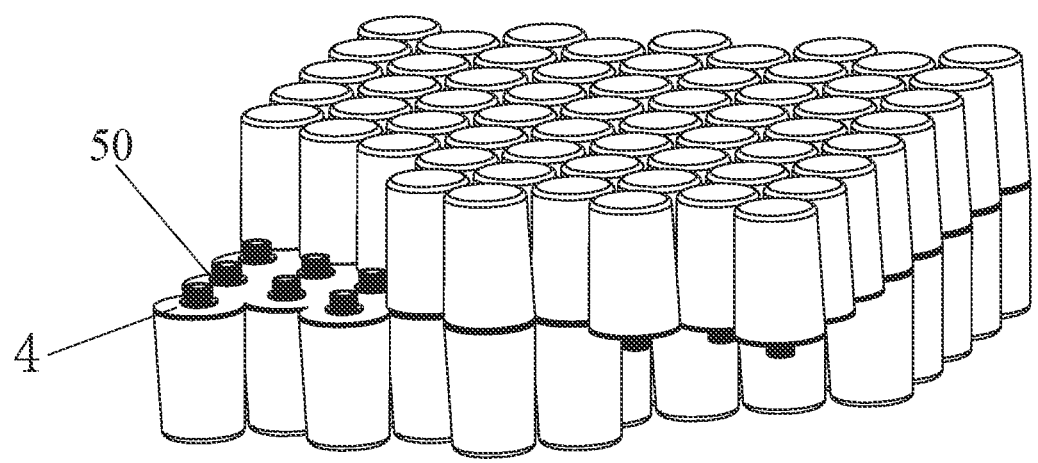
FIG. 4 illustrates a perspective view of springs in dual layers of the elastic module in Embodiment 1.

Referring to FIGS. 1-4, an elastic module 6 comprising springs 10 in multiple layers comprises springs 10 in a first layer 1 of the multiple layers and springs 10 in a second layer 2 of the multiple layers. Rows of the springs 10 in the first layer 1 are staggered to be arranged in a roughly rectangular shape (or a roughly square shape). The springs 10 in the second layer 2 are disposed above the springs 10 in the first layer 1 using a layout roughly identical to the springs 10 in the first layer 1. The springs 10 in the first layer 1 and the springs 10 in the second layer 2 are independently wrapped by flexible material sleeves 3 (for example, cloth sleeves). The elastic module 6 comprising the springs 10 in the multiple layers also comprises a flexible material balancing layer 4 (e.g., a cloth balancing layer 4 (i.e., a balancing cloth 4)). The flexible material balancing layer 4 is disposed between the springs 10 in the first layer 1 and the springs 10 in the second layer 2 to connect the springs 10 in adjacent dual layers (i.e., the springs 10 in the first layer 1 and the springs 10 in the second layer 2) together in a lateral direction of the flexible material balancing layer 4. An area of bottom surfaces 2.1 of the springs 10 in the second layer 2 is larger than an area of other sections 2.2 of the springs 10 in the second layer 2, and the springs 10 in the second layer 2 abut each other. Upper ends of the springs 10 in the second layer 2 have spaces for free movement. As a replacement, the upper ends of the springs 10 in the second layer 2 and lower ends of the springs in the first layer 1 abut with each other or abut next to the flexible material balancing layer 4.

Figure 5:
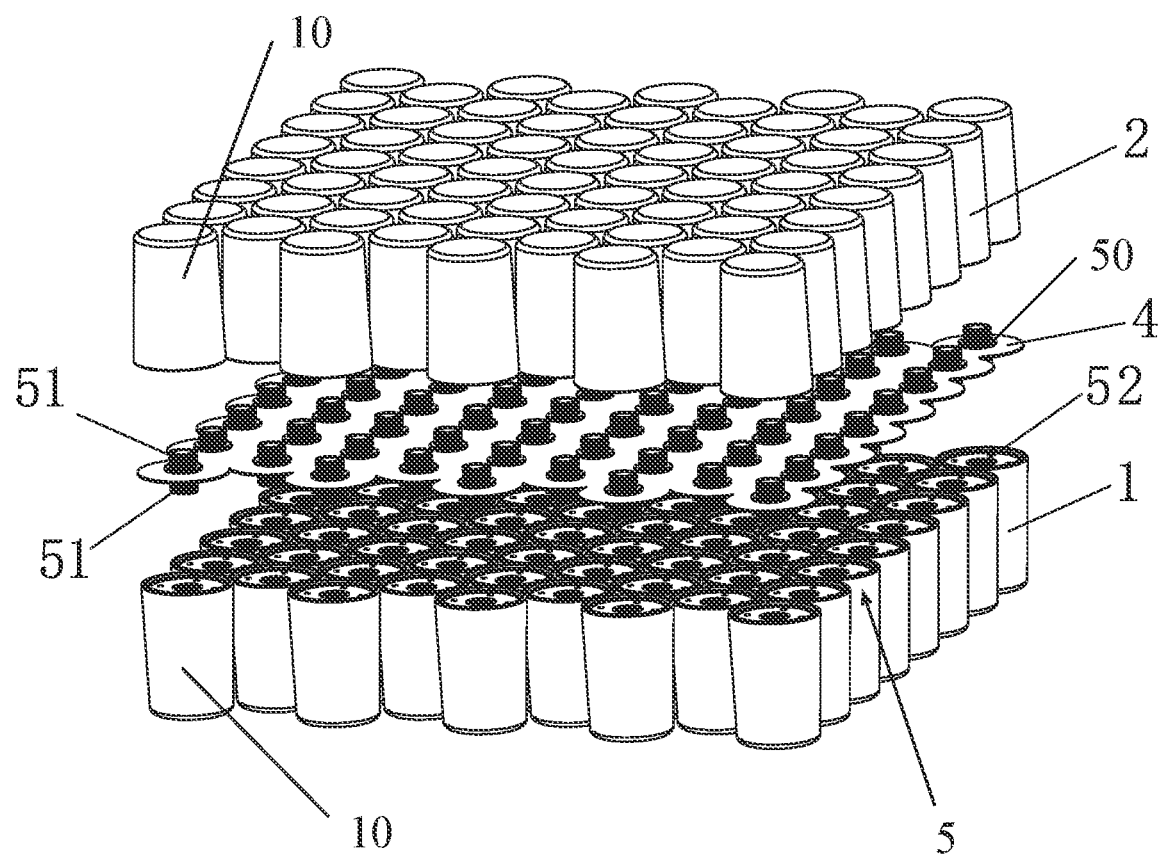
FIG. 5 illustrates a view of an assembly relationship of Embodiment 1.

Specifically, referring to FIG. 5, a top of a cloth sleeve wrapping the springs 10 in the first layer 1 and a bottom of a cloth sleeve wrapping the springs 10 in the second layer 2 comprise first connectors 52 having internal threads of connectors 5. The flexible material balancing layer 4 comprises second connectors 50 of the connectors 5 disposed according to an arrangement of the springs 10, and two ends of the second connectors 50 comprise external threads 51. The first connectors 52 having the internal threads are respectively screwed to the external threads 51 of the second connectors 50 to define the elastic module 6 comprising the springs 10 in the multiple layers.

The springs 10 in the first layer 1 and the springs 10 in the second layer 2 can have different elasticity. For example, the springs 10 in the first layer 1 are more rigid, while the springs 10 in the second layer 2 are more flexible. When the elastic module 6 is used, the springs 10 in the second layer 2 can be used as a surface layer of the elastic module 6, or the springs 10 in the first layer 1 can be used as the surface layer, wherein the surface layer is a layer contacting a human body.

Embodiment 2

Figure 6:
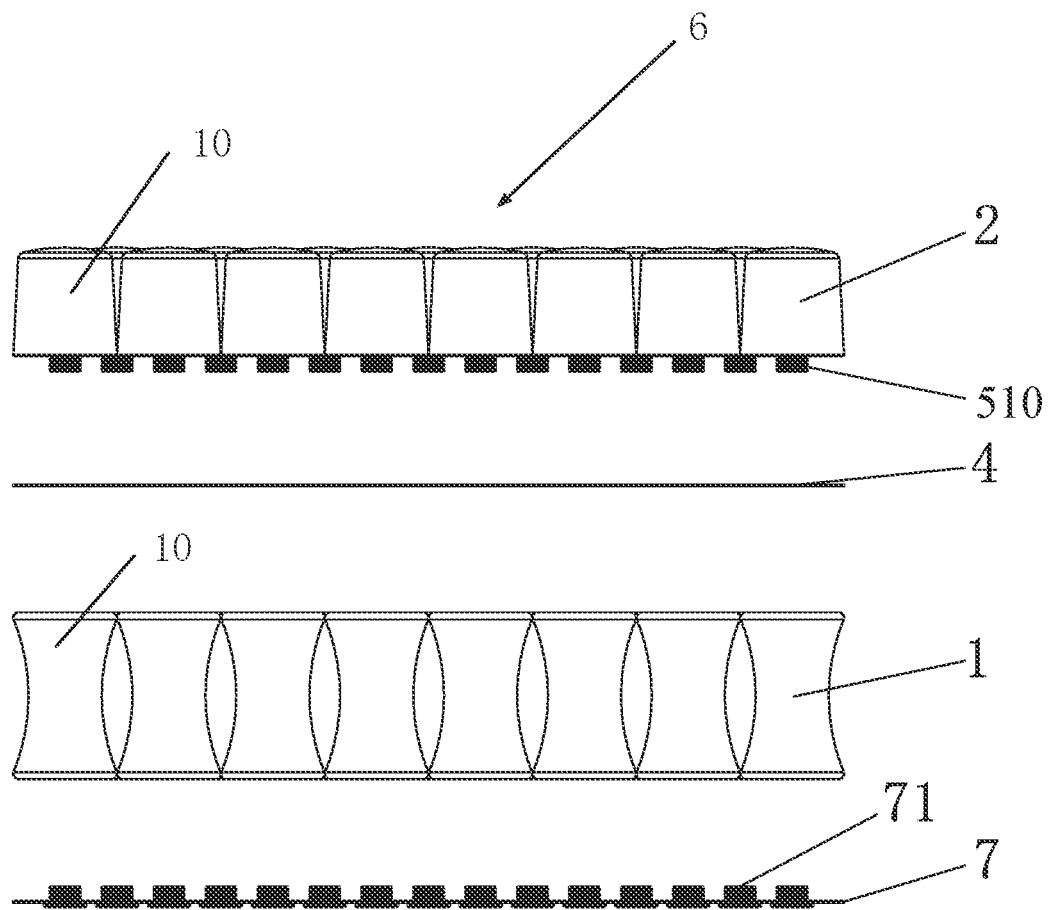
FIG. 6 illustrates a planar layout of an elastic module in Embodiment 2 of the present disclosure.
Figure 7:
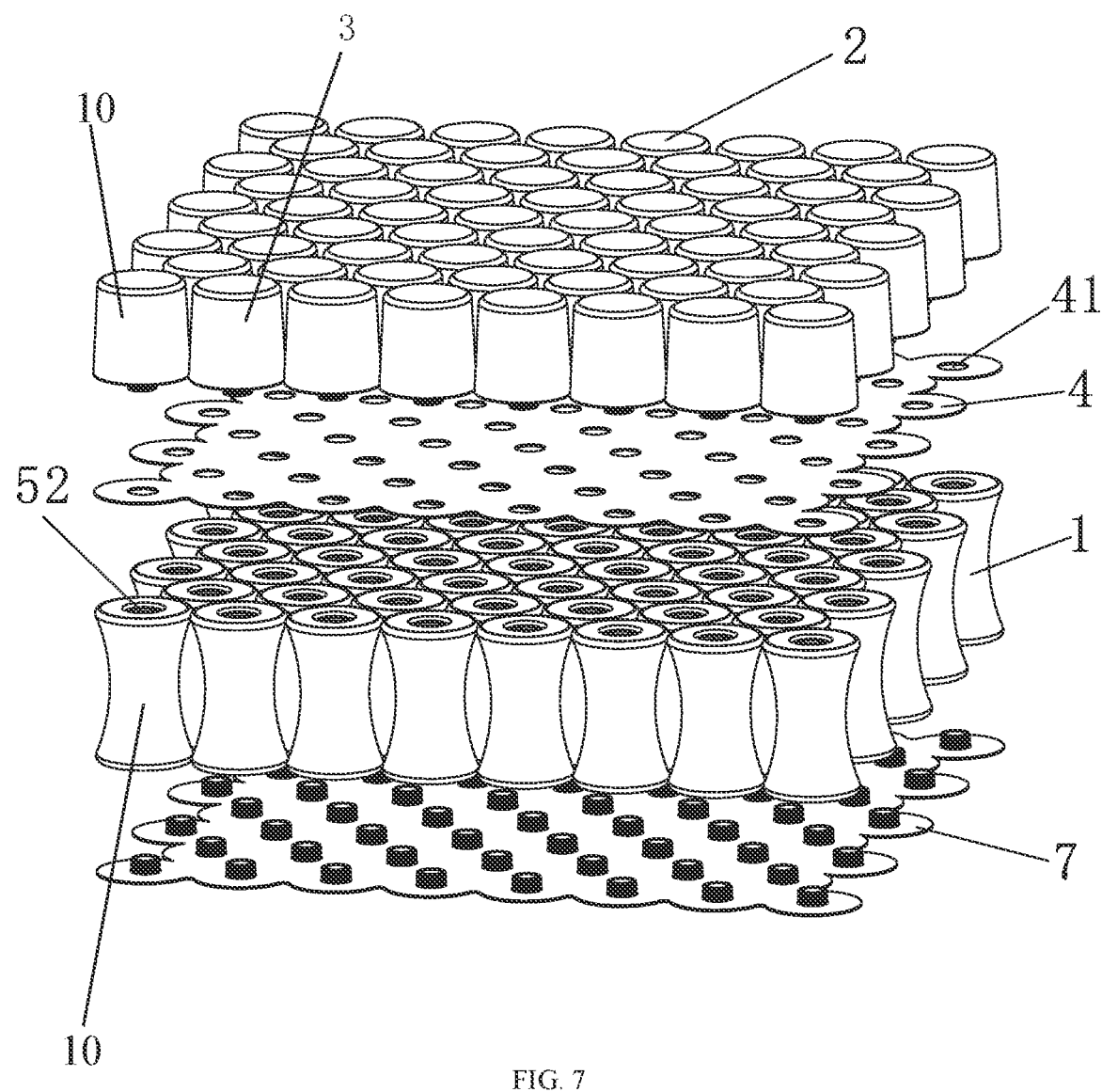
FIG. 7 illustrates an exploded view of the elastic module in Embodiment 2.
Figure 8:
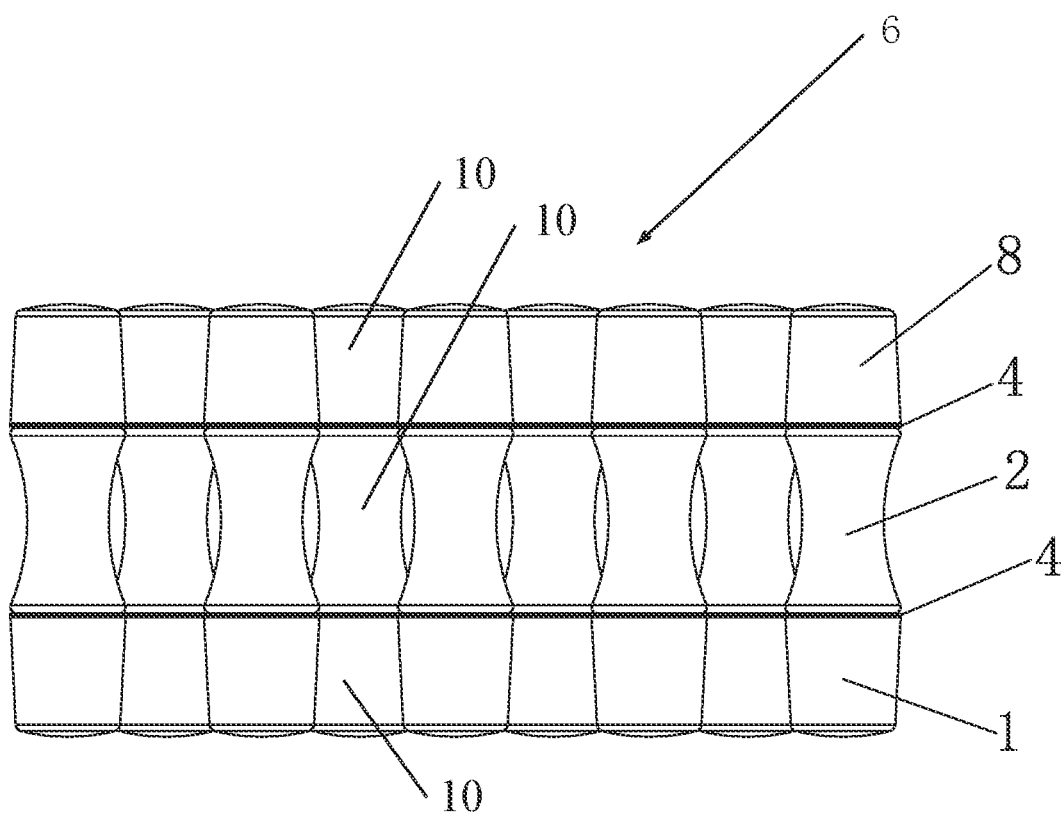
FIG. 8 illustrates a front view of an elastic module in Embodiment 3 of the present disclosure.
Figure 9:
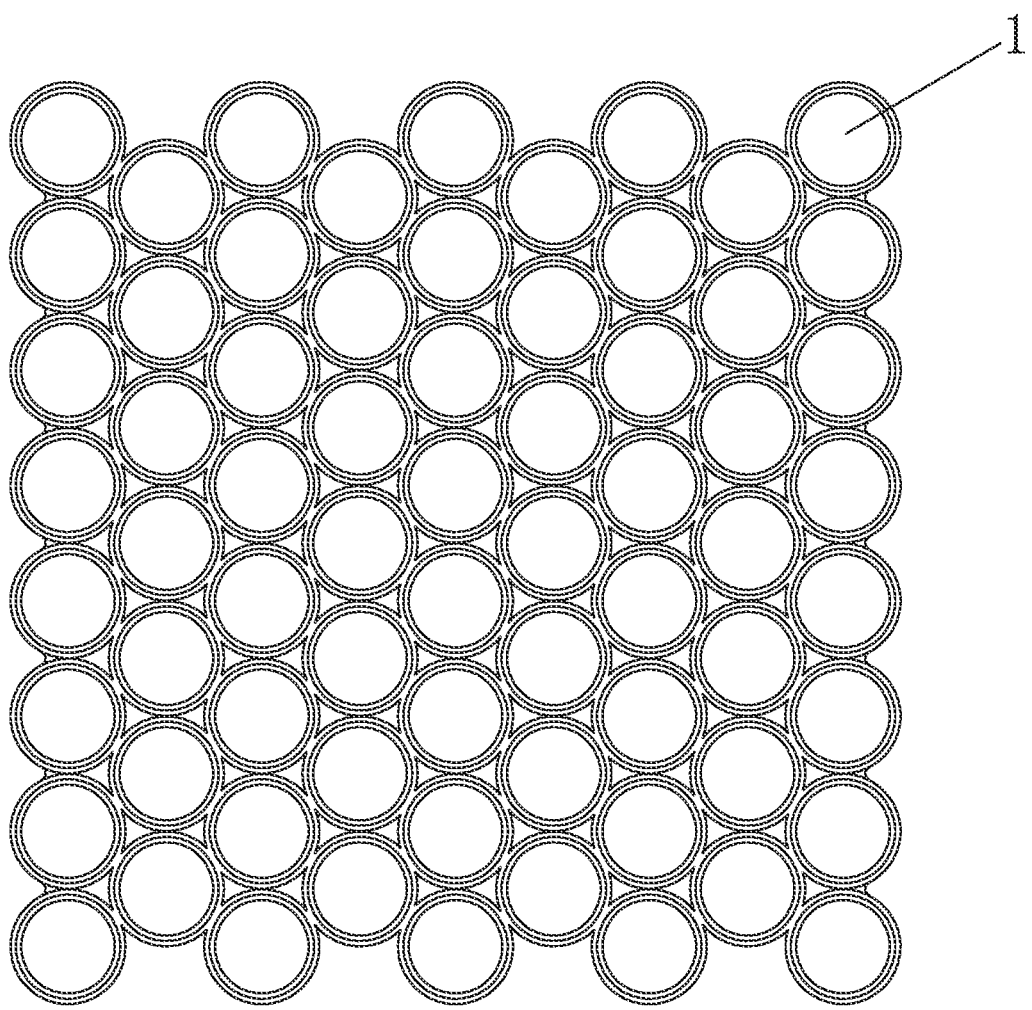
FIG. 9 illustrates a bottom view of FIG. 8 of the elastic module of Embodiment 3.
Figure 10:
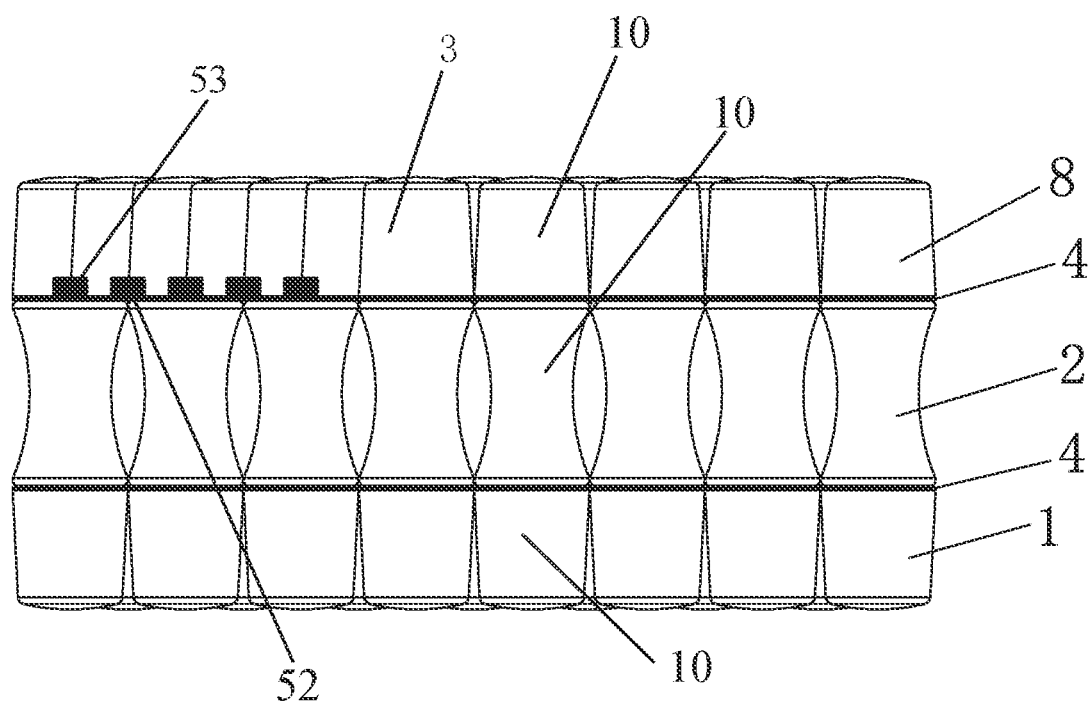
FIG. 10 illustrates a side view of FIG. 8 of the elastic module of Embodiment 3.

Referring to FIGS. 6 and 7, a spring arrangement of the springs 10 in the dual layers in this embodiment is the same as the spring arrangement of the springs 10 in the dual layers in Embodiment 1. The elastic module 6 in this embodiment comprises a bottom flexible material balancing layer 7 (e.g., a bottom cloth balancing layer 7), the springs in the first layer 1, the flexible material balancing layer 4, and the springs in the second layer 2. The bottom cloth balancing layer 7 comprises third connectors 71 disposed in an array, and the array of the third connectors 71 is roughly the same as an array of the springs 10 in the first layer 1. The springs 10 in the first layer 1 and the springs 10 in the second layer 2 are wrapped by cloth sleeves 3. Two ends of the springs 10 in the first layer 1 comprise the first connectors 52, and the first connectors 52 are connectors with internal threads. The flexible material balancing layer 4 comprises through holes 41. Lower ends of the springs 10 in the second layer 2 comprise fourth connectors 510, and the fourth connectors 510 are connectors with external threads. The first connectors 52 of the springs 10 in the first layer 1 are screwed to the external threads of the third connectors 71 of the bottom cloth balancing layer 7 to form the springs 10 in the first layer 1 in a first array. The fourth connectors 510 of the springs 10 in the second layer 2 are connected to the first connectors 52 of the springs 10 in the first layer 1 through the through holes 41 of the flexible material balancing layer 4. At the same time, the flexible material balancing layer 4 is clamped between the springs 10 in the first layer 1 and the springs in the second layer 2.

Embodiment 3

Referring to FIGS. 8 to 11, the embodiment provides an elastic module 6 comprising springs 10 in three layers. The elastic module comprising the springs 10 in the three layers comprises the springs 10 in a first layer 1, the springs 10 in a second layer 2, and the springs 10 in a third layer 8. Rows of the springs 10 in the first layer 1, rows of the springs 10 in the second layer 2, and rows of the springs 10 in the third layer 8 are respectively staggered to be arranged in a roughly rectangular shape (or a roughly square shape). The springs 10 in the second layer 2 are disposed above the springs 10 in the first layer 1 using a layout roughly identical to the springs 10 in the first layer 1, and the springs 10 in the third layer 8 are disposed above the springs 10 in the second layer 2 using a layout roughly identical to the springs 10 in the first layer 1. The springs 10 in the first layer 1, the springs 10 in the second layer 2, and the springs 10 in the third layer 8 are independently wrapped by flexible material sleeves 3 (for example, cloth sleeves). Upper-lower springs of the springs 10 in the first layer 1, the springs 10 in the second layer 2, and the springs 10 in the third layer 8 are connected by connectors 5. Flexible material balancing layers 4 (e.g., a cloth balancing layer 4) are further provided. The flexible material balancing layers 4 are disposed between the springs 10 in the first layer 1 and the springs 10 in the second layer 2 or between the springs 10 in the second layer 2 and the springs 10 in the third layer 8 to connect the springs 10 in the multiple layers together in a lateral direction of the flexible material balancing layers 4.

A connection method of the springs 10 in the first layer 1, the springs 10 in the second layer 2, and a first flexible material balancing layer of the flexible material balancing layers 4, and a connection method of the springs 10 in the second layer 2, the springs 10 in the third layer 8, and a second flexible material balancing layer of the flexible material balancing layers 4 can adopt the connection method in Embodiment 2. As a replacement, a connection method of the springs 10 in the first layer 1, the springs 10 in the second layer 2, and the first flexible material balancing layer can adopt the connection method in Embodiment 2, and a connection method of the springs 10 in the second layer 2, the springs 10 in the third layer 8, and the second flexible material balancing layer can adopt the connection method in Embodiment 1.

Specifically, upper ends of the springs 10 in the first layer 1 and the springs 10 in the second layer 2 comprise first connectors 52 of the connectors 5, and lower ends of the springs 10 in the second layer 2 and lower ends of the springs 10 in the third layer 8 comprise fifth connectors 53 of the connectors 5. The first connectors 52 cooperate with the fifth connectors 53. The flexible material balancing layers 4 comprise through holes 4.1, the connectors 5 are the first connectors 52 and the fifth connectors 53, and the first connectors 52 and the fifth connectors 53 pass through the through holes 4.1 of the flexible material balancing layers 4 and are respectively clamped between the springs 10 in the first layer 1 and the springs 10 in the second layer 2 and between the springs 10 in the second layer 2 and the springs 10 in the third layer 8. The first connectors 52 are connectors with internal threads, and the fifth connectors 53 are connectors with external threads.

Figure 11:
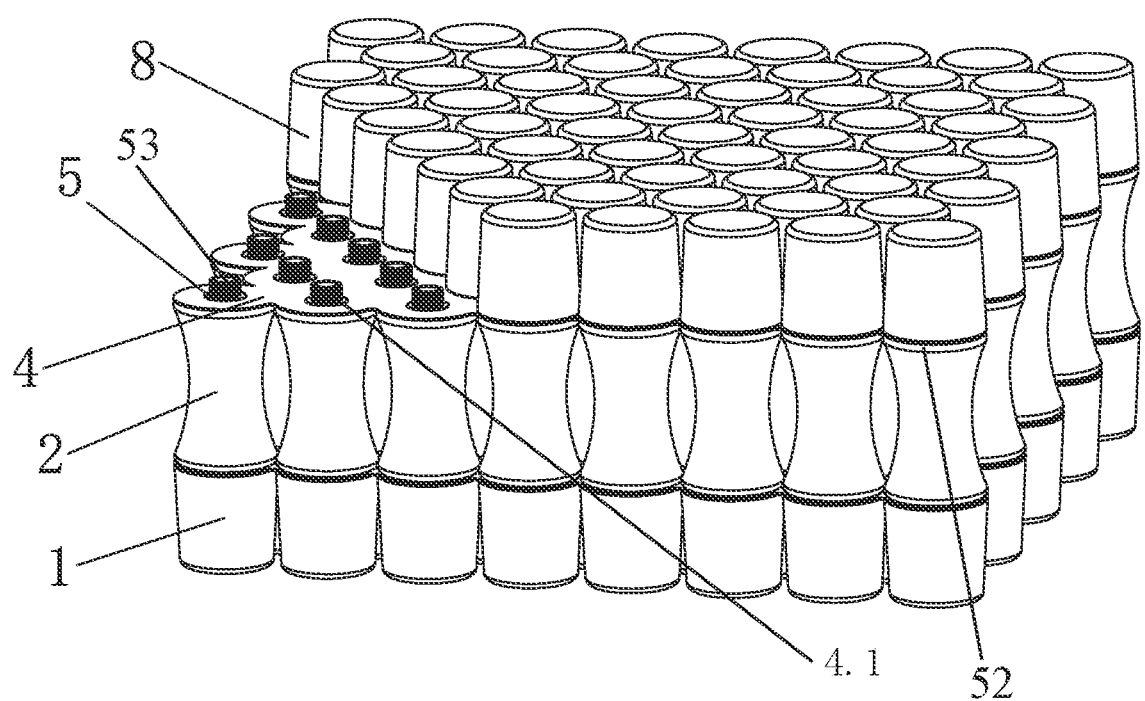
FIG. 11 illustrates a perspective view of the elastic module in Embodiment 3.

As a replacement, referring to FIG. 11, the springs 10 in the second layer 2 are assembled to one end of external threads comprising the fifth connectors 53, which is the same as the connection method in Embodiment 1. Bottom ends of the springs 10 in the third layer 8 comprise the first connectors 52 to connect the springs 10 in the third layer 8 and the springs 10 in the second layer 2 together. The flexible material sleeves 3 (for example, the cloth sleeves 3) at tops of the springs 10 in the first layer 1 and bottoms of the springs 10 in the second layer 2 comprises the first connectors 52 and the fifth connectors 53. The first flexible material balancing layer comprises through holes corresponding to connection positions of the springs 10 in the first layer 1 and the springs 10 in the second layer 2. The first connectors 52 and the fifth connectors 53 pass through the through holes of the first flexible material balancing layer to connect the springs 10 in the first layer 1 and the springs 10 in the second layer 2 together.

Embodiment 4

Figure 12:
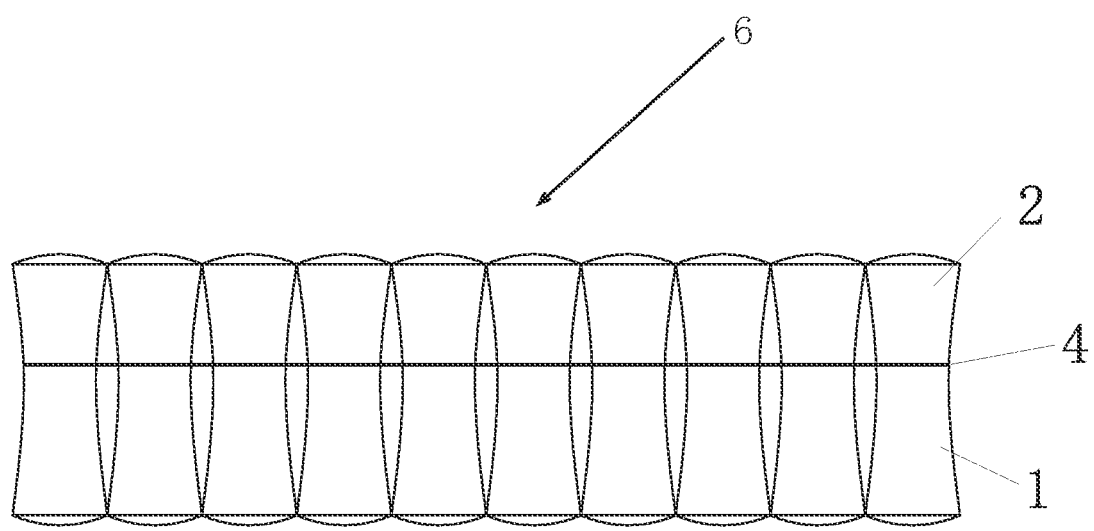
FIG. 12 illustrates a view of springs in dual layers of an elastic module in Embodiment 4.
Figure 13:
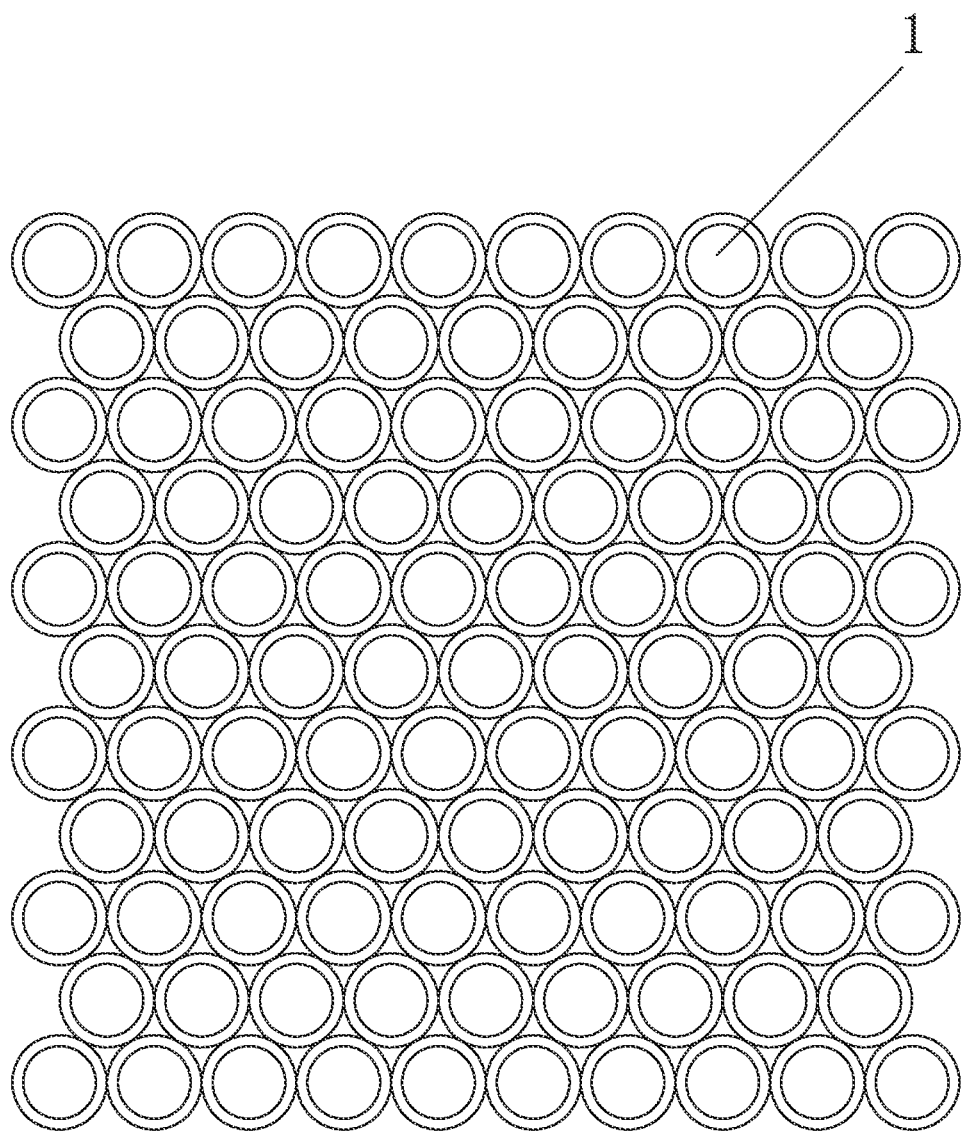
FIG. 13 illustrates a view of an arrangement of the elastic module in Embodiment 4.

Referring to FIGS. 12 and 13, the elastic module 6 in this embodiment is the springs 10 in the dual layers, and a planar arrangement of the springs 10 in the dual layers is the same as the staggered planar arrangement in Embodiment 1. Embodiment 4 differs from embodiment 1 in that adjacent springs of upper ends of the springs 10 in the second layer 2 abut each other, adjacent springs of lower ends of the springs 10 in the first layer 1 abut each other, and the flexible material balancing layer 4 is made of silica gel material. This arrangement of the springs 10 has less interference between the springs 10 and good independence.

Embodiment 5

An elastic mattress comprises one or more aforementioned elastic modules 6, the one or more elastic modules 6 are spliced, lapped, or connected in series by an outer annular fixing belt.

The arrangement and the connectors in the embodiments do not limit the elastic module 6 of the present disclosure and the elastic mattress made by the elastic module 6. A person of skill in the art can form the elastic module 6 through other arrangements, and the connectors are not the only specified method in this embodiment. As long as the waists of the springs 10 can be connected together using the connectors, the elastic module 6 can form the elastic mattress in alternative ways.

The arrangement and the connectors in the embodiments do not limit the elastic module 6 of the present disclosure and the elastic mattress made by the elastic module. The person of skill in the art can form the elastic module through other arrangements, and the connectors are not the only specified method in this embodiment, wherein the springs 10 in the multiple layers are assembled and arranged to form the elastic module 6 through a layer of the flexible material balancing layer 4. A scope of the present disclosure should cover the elastic module 6 formed through various methods.

What is claimed is:

1. An elastic module comprising springs in multiple layers, comprising:
   springs in a first layer of the multiple layers,
   springs in a second layer of the multiple layers, and
   a flexible material balancing layer, wherein:
      the springs in the first layer are arranged in rows and lines to form a preset shape or staggered in rows to form the preset shape,
      the springs in the second layer are disposed on the springs in the first layer in a same layout,
      the springs in the first layer and the springs in the second layer are independently wrapped by flexible material sleeves,
      the springs in the first layer and the springs in the second layer are connected by connectors,
      the flexible material balancing layer is disposed between the springs in the first layer and the springs in the second layer to connect the springs in the first layer and the springs in the second layer in a lateral direction,
      an area of bottom surfaces of the springs in the second layer is larger than an area of other lateral cross-sections of the springs in the second layer, and
      the springs in the second layer abut each other.

2. The elastic module comprising the springs in the multiple layers according to claim 1, wherein:
   upper ends of the springs in the first layer comprise first connectors of the connectors, lower ends of the springs in the second layer comprises second connectors of the connectors, and
   the flexible material balancing layer is clamped and fixed between the first connectors and the second connectors.

3. The elastic module comprising the springs in the multiple layers according to claim 2, wherein:
   the first connectors are connectors with internal threads, and
   the second connectors are connectors with external threads.

4. The elastic module comprising the springs in the multiple layers according to claim 1, wherein:
   top ends of the flexible material sleeves in the first layer and bottom ends of the flexible material sleeves in the second layer comprise first connectors of the connectors,
   the flexible material balancing layer comprises third connectors of the connectors at positions corresponding to the springs in the first layer and the springs in the second layer, and
   the first connectors are matched with the third connectors.

5. The elastic module comprising the springs in the multiple layers according to claim 4, wherein:

the first connectors are connectors with internal threads, and the third connectors are connectors with two ends comprising external threads.

6. The elastic module comprising the springs in the multiple layers according to claim 1, wherein:

bottom surfaces of the springs in the first layer are disposed on a bottom flexible material balancing layer by being bonded to the flexible material sleeves wrapped on the springs in the first layer or connected and fixed by a fixing piece.

7. The elastic module comprising the springs in the multiple layers according to claim 6, wherein the bottom flexible material balancing layer comprises a bottom cloth balancing layer.

8. An elastic mattress, comprising:

two or more elastic modules according to claim 1, wherein:

multiple of the two or more elastic modules are spliced, lapped, or connected in series.

9. The elastic module comprising the springs in the multiple layers according to claim 1, wherein the flexible material balancing layer comprises a cloth balancing layer.

10. The elastic module comprising the springs in the multiple layers according to claim 1, wherein the flexible material sleeves comprise cloth sleeves.

11. The elastic module comprising the springs in the multiple layers according to claim 1, wherein the springs in the second layer abut each other next to the flexible material balancing layer.

12. An elastic module comprising springs in multiple layers, comprising:

springs in a first layer of the multiple layers,
springs in a second layer of the multiple layers,
springs in a third layer of the multiple layers, and
flexible material balancing layers, wherein:

the springs in the first layer are arranged in rows and lines to form a preset shape or staggered in rows to form the preset shape, the springs in the second layer are disposed on the springs in the first layer in a same layout, the springs in the third layer are disposed on the springs in the second layer in the same layout, the springs in the first layer, the springs in the second layer, and the springs in the third layer are independently wrapped by flexible material sleeves, the springs in the second layer are connected to the springs in the first layer and the springs in the third layer by connectors, the flexible material balancing layers are disposed between the springs in the first layer and the springs in the second layer and between the springs in the second layer and the springs in the third layer to connect the springs in the multiple layers in a lateral direction, upper ends of the springs in the first layer and upper ends of the springs in the second layer comprise first connectors of the connectors, lower ends of the springs in the second layer and lower ends of the springs in the third layer comprise second connectors of the connectors, the first connectors are matched with the second connectors, and the flexible material balancing layers are respectively clamped between the first connectors and the second connectors of the springs in the first layer and the springs in the second layer and between the first connectors and the second connectors of the springs in the second layer and the springs in the third layer.

13. The elastic module comprising the springs in the multiple layers according to claim 12, wherein:

an area of bottom surfaces of the springs in the third layer is larger than an area of other lateral cross-sections of the springs in the third layer, and the springs in the third layer abut each other at the bottom surfaces of the springs in the third layer.

14. The elastic module comprising the springs in the multiple layers according to claim 12, wherein:

bottom surfaces of the springs in the first layer are disposed on a bottom flexible material balancing layer by being bonded to the flexible material sleeves wrapped on the springs in the first layer or connected and fixed by a fixing piece.

15. The elastic module comprising the springs in the multiple layers according to claim 7, wherein the flexible material balancing layers comprise cloth balancing layers.

16. The elastic module comprising the springs in the multiple layers according to claim 12, wherein:

the first connectors are connectors with internal threads, and the second connectors are connectors with external threads.

17. An elastic mattress, comprising:

two or more elastic modules according to claim 7, wherein:

multiple of the two or more elastic modules are spliced, lapped, or connected in series.

18. An elastic module comprising springs in multiple layers, comprising:

springs in a first layer of the multiple layers,
springs in a second layer of the multiple layers, and
a flexible material balancing layer, wherein:

the springs in the first layer are arranged in rows and lines to form a preset shape or staggered in rows to form the preset shape, the springs in the second layer are disposed on the springs in the first layer in a same layout, the springs in the first layer and the springs in the second layer are independently wrapped by flexible material sleeves, the springs in the first layer and the springs in the second layer are connected by connectors, the flexible material balancing layer is disposed between the springs in the first layer and the springs in the second layer to connect the springs in the first layer and the springs in the second layer in a lateral direction, and the springs in the second layer abut each other next to the flexible material balancing layer.

19. An elastic module comprising springs in multiple layers, comprising:

springs in a first layer of the multiple layers,
springs in a second layer of the multiple layers, and
a flexible material balancing layer, wherein:

the springs in the first layer are arranged in rows and lines to form a preset shape or staggered in rows to form the preset shape, the springs in the second layer are disposed on the springs in the first layer in a same layout, the springs in the first layer and the springs in the second layer are independently wrapped by flexible material sleeves, the springs in the first layer and the springs in the second layer are connected by connectors, the flexible material balancing layer is disposed between the springs in the first layer and the springs in the second layer to connect the springs in the first layer and the springs in the second layer in a lateral direction, and lower ends of the springs in the first layer abut each other or upper ends of the springs in the second layer abut each other.

20. An elastic module comprising springs in multiple layers, comprising:

springs in a first layer of the multiple layers, springs in a second layer of the multiple layers, springs in a third layer of the multiple layers, and flexible material balancing layers, wherein:

the springs in the first layer are arranged in rows and lines to form a preset shape or staggered in rows to form the preset shape, the springs in the second layer are disposed on the springs in the first layer in a same layout, the springs in the third layer are disposed on the springs in the second layer in the same layout, the springs in the first layer, the springs in the second layer, and the springs in the third layer are independently wrapped by flexible material sleeves, the springs in the second layer are connected to the springs in the first layer and the springs in the third layer by connectors, the flexible material balancing layers are disposed between the springs in the first layer and the springs in the second layer and between the springs in the second layer and the springs in the third layer to connect the springs in the multiple layers in a lateral direction, top ends of the flexible material sleeves in the first layer and the second layer and bottom ends of the flexible material sleeves in the second layer and the third layer comprise first connectors of the connectors, the flexible material sleeves comprise third connectors of the connectors at positions corresponding to the springs in the first layer, the springs in the second layer, and the springs in the third layer, and the first connectors are matched with the third connectors.

21. The elastic module comprising the springs in the multiple layers according to claim 20, wherein:

the first connectors are connectors with internal threads, and the third connectors are connectors with two ends comprising external threads.

\* \* \* \* \*